US008846231B2

(12) United States Patent
Buck et al.

(10) Patent No.: US 8,846,231 B2
(45) Date of Patent: Sep. 30, 2014

(54) BATTERY ASSEMBLY WITH TEMPERATURE CONTROL DEVICE

(75) Inventors: Derrick S. Buck, Pendleton, IN (US); Robert N. Fattig, Anderson, IN (US); Bruce J. Silk, Indianapolis, IN (US)

(73) Assignee: Enerdel, Inc., Greenfield, IN (US)

( * ) Notice: Subject to any disclaimer, the term of this patent is extended or adjusted under 35 U.S.C. 154(b) by 662 days.

(21) Appl. No.: 12/741,510

(22) PCT Filed: Nov. 7, 2008

(86) PCT No.: PCT/US2008/012545
§ 371 (c)(1),
(2), (4) Date: Aug. 13, 2010

(87) PCT Pub. No.: WO2009/061451
PCT Pub. Date: May 14, 2009

(65) Prior Publication Data
US 2010/0304203 A1 Dec. 2, 2010

Related U.S. Application Data

(60) Provisional application No. 61/002,163, filed on Nov. 7, 2007.

(51) Int. Cl.
*H01M 10/50* (2006.01)
*H01M 10/38* (2006.01)

(52) U.S. Cl.
USPC ........... 429/120; 429/123; 429/158; 429/163; 429/177

(58) Field of Classification Search
USPC .......................... 429/120, 123, 158, 163, 177
See application file for complete search history.

(56) References Cited

U.S. PATENT DOCUMENTS

| 3,686,530 | A | | 8/1972 | Bogut |
| 4,020,244 | A | | 4/1977 | Selinko |
| 4,080,728 | A | * | 3/1978 | Buckler ...................... 29/623.4 |
| 4,314,008 | A | | 2/1982 | Blake |
| 4,347,294 | A | | 8/1982 | Mejia |
| 4,579,792 | A | | 4/1986 | Bruder |
| 4,680,242 | A | | 7/1987 | Simonton et al. |

(Continued)

FOREIGN PATENT DOCUMENTS

| CN | 1816271 | 9/2006 |
| CN | 1856889 | 11/2006 |

(Continued)

OTHER PUBLICATIONS

International Search Authority, International Search Report and Written Opinion of the ISA, PCT/US2009/043459, Sep. 9, 2009, 7 pgs.

(Continued)

*Primary Examiner* — Milton I Cano
*Assistant Examiner* — Jeremiah Smith (57) ABSTRACT

A battery module of the present invention is adaptable to be utilized in various configurations including and not limited to an overlapping battery cell packaging configuration and a vertical stack battery cell packaging configuration used in an automotive and non-automotive applications. The battery module has a plurality of battery heatsink assemblies with the cells disposed therebetween. A plurality of rods extend through the each heatsink assemblies to secure the heatsink assemblies and the cell with one another to form the battery module.

20 Claims, 7 Drawing Sheets

(56) References Cited

U.S. PATENT DOCUMENTS

| | | | |
|---|---|---|---|
| 4,927,717 A | 5/1990 | Turley et al. |
| 5,049,457 A | 9/1991 | Niksa et al. |
| 5,071,652 A | 12/1991 | Jones et al. |
| 5,256,502 A | 10/1993 | Kump |
| 5,354,630 A | 10/1994 | Earl et al. |
| 5,378,555 A | 1/1995 | Waters et al. |
| 5,393,617 A | 2/1995 | Klein |
| 5,424,143 A | 6/1995 | Shrim |
| 5,456,994 A | 10/1995 | Mita |
| 5,518,836 A | 5/1996 | McCullough |
| 5,567,544 A | 10/1996 | Lyman |
| 5,639,571 A | 6/1997 | Waters et al. |
| 5,756,227 A | 5/1998 | Suzuki et al. |
| 5,773,959 A | 6/1998 | Merritt et al. |
| 5,800,942 A | 9/1998 | Hamada et al. |
| 5,849,434 A | 12/1998 | Miura et al. |
| 5,853,914 A | 12/1998 | Kawakami |
| 5,874,185 A | 2/1999 | Wang et al. |
| 5,879,831 A | 3/1999 | Ovshinsky et al. |
| 5,900,183 A | 5/1999 | Kronfli et al. |
| 5,952,126 A | 9/1999 | Lee et al. |
| 5,961,672 A | 10/1999 | Skotheim et al. |
| 6,001,504 A | 12/1999 | Batson et al. |
| 6,104,967 A | 8/2000 | Hagen et al. |
| 6,117,584 A | 9/2000 | Hoffman et al. |
| 6,120,935 A | 9/2000 | Van Lerberghe |
| 6,225,778 B1 | 5/2001 | Hayama et al. |
| 6,255,015 B1 | 7/2001 | Corrigan et al. |
| 6,340,877 B1 | 1/2002 | Mita et al. |
| 6,344,728 B1 | 2/2002 | Kouzu et al. |
| 6,368,743 B1 | 4/2002 | Guerin et al. |
| 6,391,489 B1 | 5/2002 | Winch et al. |
| 6,406,815 B1 | 6/2002 | Sandberg et al. |
| 6,479,185 B1 | 11/2002 | Hilderbrand et al. |
| 6,569,561 B1 | 5/2003 | Kimura et al. |
| 6,709,783 B2 | 3/2004 | Ogata et al. |
| 6,724,170 B1 | 4/2004 | Maggert et al. |
| 6,729,908 B2 | 5/2004 | Benson et al. |
| 6,761,992 B1 | 7/2004 | Marukawa et al. |
| 6,821,671 B2 | 11/2004 | Hinton et al. |
| 6,858,344 B2 | 2/2005 | Marukawa et al. |
| 7,190,588 B2 | 3/2007 | Lee et al. |
| 7,320,846 B2 | 1/2008 | Watanabe et al. |
| 7,531,270 B2 | 5/2009 | Buck et al. |
| 7,572,549 B2 | 8/2009 | Wegner |
| 7,625,665 B2 | 12/2009 | Jeon et al. |
| 7,740,978 B2 | 6/2010 | Hamada et al. |
| 2001/0007728 A1 | 7/2001 | Ogata et al. |
| 2002/0022178 A1 | 2/2002 | Asaka et al. |
| 2002/0045096 A1 | 4/2002 | Sandberg et al. |
| 2002/0155348 A1 | 10/2002 | Gitto |
| 2002/0177035 A1 | 11/2002 | Oweis et al. |
| 2003/0031920 A1 | 2/2003 | Hoffman et al. |
| 2003/0194605 A1 | 10/2003 | Fauteux |
| 2003/0211384 A1 | 11/2003 | Hamada et al. |
| 2004/0016455 A1 | 1/2004 | Oogami |
| 2004/0021442 A1 | 2/2004 | Higashino |
| 2004/0050414 A1* | 3/2004 | Oogami ............... 136/249 |
| 2004/0058233 A1 | 3/2004 | Hamada et al. |
| 2004/0115519 A1 | 6/2004 | Lee |
| 2004/0253512 A1 | 12/2004 | Watanabe et al. |
| 2004/0265687 A1 | 12/2004 | Chan et al. |
| 2005/0031946 A1 | 2/2005 | Kruger et al. |
| 2005/0084754 A1 | 4/2005 | Klein |
| 2005/0089750 A1 | 4/2005 | Ng et al. |
| 2005/0089751 A1 | 4/2005 | Oogami et al. |
| 2005/0100783 A1 | 5/2005 | Ro et al. |
| 2005/0123828 A1 | 6/2005 | Oogami et al. |
| 2005/0202311 A1 | 9/2005 | Higashino et al. |
| 2005/0208375 A1 | 9/2005 | Sakurai |
| 2005/0220682 A1* | 10/2005 | McLean et al. ............... 422/193 |
| 2005/0271934 A1 | 12/2005 | Kiger et al. |
| 2005/0274705 A1 | 12/2005 | Zhu et al. |
| 2006/0169507 A1 | 8/2006 | Inoue et al. |
| 2006/0177733 A1 | 8/2006 | Ha et al. |
| 2006/0234119 A1 | 10/2006 | Kruger et al. |
| 2007/0018610 A1 | 1/2007 | Wegner |
| 2007/0026301 A1 | 2/2007 | Lee et al. |
| 2007/0037051 A1 | 2/2007 | Kim et al. |
| 2007/0052390 A1 | 3/2007 | Kim et al. |
| 2007/0080662 A1 | 4/2007 | Wu |
| 2007/0132429 A1 | 6/2007 | Onuki et al. |
| 2007/0207349 A1 | 9/2007 | Kemper et al. |
| 2007/0252556 A1 | 11/2007 | West et al. |
| 2007/0269714 A1* | 11/2007 | Watanabe et al. .............. 429/120 |
| 2007/0279953 A1 | 12/2007 | Hoff et al. |
| 2008/0014499 A1 | 1/2008 | Ling |
| 2008/0090137 A1 | 4/2008 | Buck et al. |
| 2009/0023059 A1* | 1/2009 | Kinoshita et al. .............. 429/153 |
| 2009/0053585 A1 | 2/2009 | Nakazawa |
| 2009/0162744 A1 | 6/2009 | Zheng et al. |
| 2009/0214941 A1 | 8/2009 | Buck et al. |
| 2009/0305124 A1 | 12/2009 | Ahn et al. |
| 2010/0009248 A1 | 1/2010 | Fuhrmann et al. |
| 2010/0190049 A1 | 7/2010 | Kawase et al. |
| 2010/0273042 A1 | 10/2010 | Buck et al. |
| 2010/0304203 A1 | 12/2010 | Buck et al. |
| 2011/0033742 A1 | 2/2011 | Maier et al. |
| 2011/0104532 A1 | 5/2011 | Buck et al. |

FOREIGN PATENT DOCUMENTS

| | | | |
|---|---|---|---|
| CN | 1905268 | | 1/2007 |
| CN | 101573826 A | | 11/2009 |
| JP | 09 120809 | | 5/1997 |
| JP | 09120835 | | 5/1997 |
| JP | 2000 092624 | | 3/2000 |
| JP | 2001 229897 | | 8/2001 |
| JP | 2001 511586 | | 8/2001 |
| JP | 2002 042753 | | 2/2002 |
| JP | 2002 319383 | | 10/2002 |
| JP | 2004 055449 | | 2/2004 |
| JP | 2005 005163 | | 1/2005 |
| JP | 2005 347282 | | 12/2005 |
| JP | 2006/066323 | * | 3/2006 ............ H01M 2/10 |
| JP | 2006 66322 | | 3/2006 |
| JP | 2007 115437 | | 5/2007 |
| KR | 2001 0037119 | | 5/2001 |
| WO | WO 99/05731 | | 2/1999 |
| WO | WO 2006/101342 | | 9/2006 |
| WO | WO 2006 101343 | | 9/2006 |
| WO | WO 2007 043392 | | 4/2007 |
| WO | 2007/094263 | * | 8/2007 ............ H01M 2/30 |
| WO | WO 2009/074421 | | 6/2009 |

OTHER PUBLICATIONS

Extended European Search Report and Opinion for Application No. 08846235.3, Jul. 3, 2012, 8 pgs.
International Searching Authority, International Search Report, PCT/US2008/012545. dated Jan. 9, 2009.
International Searching Authority (ISA), Written Opinion of the ISA, PCT/US2008/012545, dated Jan. 9, 2009.
International Searching Authority, International Search Report, PCT/US2008/013451, dated Feb. 9, 2009.
International Searching Authority (ISA), Written Opinion of the ISA, PCT/US2008/013451, dated Feb. 9, 2009.
English Translation of Office Action issued May 2013 in Japanese Patent Application 2010-533102, 7 pgs.
Office Action in CN 200780043272.8, including English translation of text portion, issued Feb. 16, 2012, 8 pages.
Response to Office Action in in CN 200780043272.8, including English translation of the amended claims, filed Jun. 14, 2012, 14 pages.
Office Action issued by the State Intellectual Property Office (SIPO) in Application No. 200880119088.1, Oct. 17, 2012, 6 pages.
English Translation of Office Action in CN200880115154.8, dated Jun. 2012, (2 pages).
English Translation of Amended Claims in CN200880115154.8, dated Sep. 2012, (5 pages).
English Translation of Office Action in CN200880115154.8, dated Dec. 2012, (5 pages).

(56) References Cited

OTHER PUBLICATIONS

English Translation of Amended Claims in CN200880115154.8, dated May 2013, (4 pages).
English Translation of Office Action in CN200880115154.8, dated Jun. 2013, (4 pages).
English Translation of Amended Claims in CN200880115154.8, dated Nov. 2013, (4 pages).
English Translation of Amended Claims in CN200880115154.8, dated Dec. 2013, (4 pages).
English Translation of Office Action in JP2010-533102, dated Dec. 2013, (6 pages).
English Translation of Claims in JP2010-533102, dated Dec. 2013, (19 pages).

* cited by examiner

BATTERY ASSEMBLY WITH TEMPERATURE CONTROL DEVICE

PRIORITY

The present application is related to, claims the priority benefit of, and is a U.S. national stage application of, International Patent Application Ser. No. PCT/US2008/012545, filed Nov. 7, 2008, which is related to, and claims the priority benefit of, U.S. Provisional Patent Application Ser. No. 61/002,163, filed Nov. 7, 2007. The contents of each of these applications are hereby incorporated by reference in their entirety into this disclosure.

FIELD OF THE INVENTION

The subject invention relates to battery packs having cells and more particularly, to a battery pack for electric/hybrid vehicles having a cooling system or a heating system for cooling the cells within the battery pack and method of retaining the cells within the battery pack.

BACKGROUND OF THE INVENTION

Motor vehicles, such as, for example, hybrid vehicles use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells typically comprise electrodes and an ion conducting electrolyte positioned therebetween. Battery packs that contain lithium ion batteries are increasingly popular with automotive applications and various commercial electronic devices because they are rechargeable and have no memory effect. Operating the lithium ion battery at an optimal operating temperature is very important to the batteries performance and lifespan.

Due to the characteristics of the lithium ion batteries, the battery pack is typically specified to operate—within an approximate ambient temperature range of −30° C. to 60° C. However, even when operating within this temperature range, the battery pack may begin to lose its capacity or ability to charge or discharge should it remain at the extremes for long periods of time. Nonetheless, it may be unavoidable that the lithium ion battery be used where the ambient temperature falls outside the temperature range.

Alluding to the above, significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

The art is replete with various designs of the battery packs with cooling and packaging systems. The U.S. Pat. No. 5,071,652 to Jones et al. teaches a metal oxide-hydrogen battery including an outer pressure vessel of circular configuration that contains a plurality of circular cell modules disposed in side-by-side relations. Adjacent cell modules are separated by circular heat transfer members that transfer heat from the cell modules to the outer vessel. Each heat transfer member includes a generally flat body or fin which is disposed between adjacent cell modules. A peripheral flange is located in contact with the inner surface of the pressure vessel. The width of each cell module is greater than the length of the flange so that the flange of each heat transfer member is out of contact with the adjacent heat transfer member. The flanges are constructed and arranged to exert an outward radial force against the pressure vessel. Tie bars serve to clamp the cell modules and heat transfer members together in the form of a stack which is inserted into the pressure vessel.

The metal oxide-hydrogen battery taught by the U.S. Pat. No. 5,071,652 to Jones et al. is designed for cylindrical type of batteries and teaches the heat transfer members in direct contact with the vessel thereby failing to create a clearance between the vessel and the heat transfer members, which can be used to introduce cooling or heating agent to cool or heat the cells.

Referring now to packaging systems of the battery cells, numerous prior art references teach metallic cases used to protect the cells from handling and vibration damage and allowing for combining of multiple cases into a single large pack. However, the metallic cases are expensive to manufacture and each different configuration requires new dies to produce the various components and new tools to assemble those components. Consequently, techniques and materials for enclosing the battery cells in envelopes creating lithium battery cell packs have been developed. Unfortunately, these packages do not provide structural rigidity or protection from handling and vibration nearly as well as the metallic cases, nor can they be combined into consistently sized groups of cells because of the inherent variation in the thickness of a lithium battery cell pack.

There remains an opportunity for an improved battery pack having cell retaining elements to maintain the battery pack at the optimal operating temperature to ensure the longest possible life cycle, with rated capacity, and charge and discharge rates.

SUMMARY OF THE INVENTION

A battery module of the present invention is adaptable to be utilized in various configurations including and not limited to a horizontally or vertically stacked battery cell packaging configurations used in automotive and non-automotive applications. The battery module has a multitude of cells each adjacent to a respective heatsink—formed from thermally conductive materials such as, for example, flat stock aluminum alloy foils and the like, without limiting the scope of the present invention. Preferably, each cell is a lithium ion cell having a first current collector and a first electrode adjacent the first current collector and a second current collector and a second electrode of charge opposite from the first electrode and adjacent the second current collector. A separator layer is positioned between the first and second electrodes with the first and second electrodes conducting electrolyte therebetween. The plurality of the first electrodes and the second electrodes are stacked and packaged into an electrical insulating envelope to form a cell.

Alluding to the above, each heatsink presents a plate formed from thermally conductive materials. The plate defines thermal transfer edges and terminal ends. Each plate defines a cut out portion and a spacer engaging said cut out portions. Each plate includes a plurality of holes to receive a plurality of rods extending therethrough to interconnect the heat sinks with one another to form the battery pack. One of the terminal ends extends into a fin presenting a first configuration having a rectangular cross section. The other terminal end extends into another fin presenting a second configuration having a L-shaped cross section. The first and second cross sections are not intended to limit the scope of the present invention and are disclosed herewith for exemplary purposes. The fins may be cold formed and are designed to transfer heat either to or from the cells depending on application.

A cell retaining device is cooperable with each heat sink. The cell retaining device includes a inner frame set and a outer frame set. The inner frames of each cell retaining device sandwiches the heat sink therebetween. The inner and outer frames present a plurality of male and female connecting features that mechanically engaged with one another to lock the prismatic cell within the inner and outer frames.—These features can be disengaged to allow for the removal of the prismatic cell for disassembly purposes. This describes a cell retaining and heat transfer assembly A device, such as a layer of material, such as foam or any other non-rigid polymeric material, is sandwiched between the prismatic cells. The device substantially covers the prismatic cells. Each heat sink has a pair of the inner frames and is connected to the opposite sides of the heat sink and mechanically engaging the respective outer frames having the respective prismatic cells in between to form a cell retaining and heat transfer assembly. This device is sandwiched between at least two of these assemblies which are mechanically stacked and electrically connected to one another to form the battery pack. As the assemblies are combined to form the battery pack, the device allows expansion and contraction of the prismatic cells during typical charge and discharge states therefore causing the cell to maintain intimate contact with the heat sink for efficient thermal transfer.

An advantage of the present invention is to provide a battery pack having excellent retention that surrounds and secures the cells.

Another advantage of the present invention is to provide a battery pack that reduces manufacturing costs due to simplified assembly methods.

Still another advantage of the present invention is to provide a means to thermally manage the battery pack to deliver and receive high rates of current; i.e. the C-rate, by efficiently removing undesired heat during the rapid charge or discharge pulse that may negatively impact the performance and life span of the battery pack.

Still another advantage of the present invention is to provide a pack that is simple in design and has a reduced mass.

Still another advantage of the present invention is to provide a battery pack that is easily expandable for varying applications.

Still another advantage of the present invention is to provide an electrically insulating shell the surrounds the prismatic cells.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
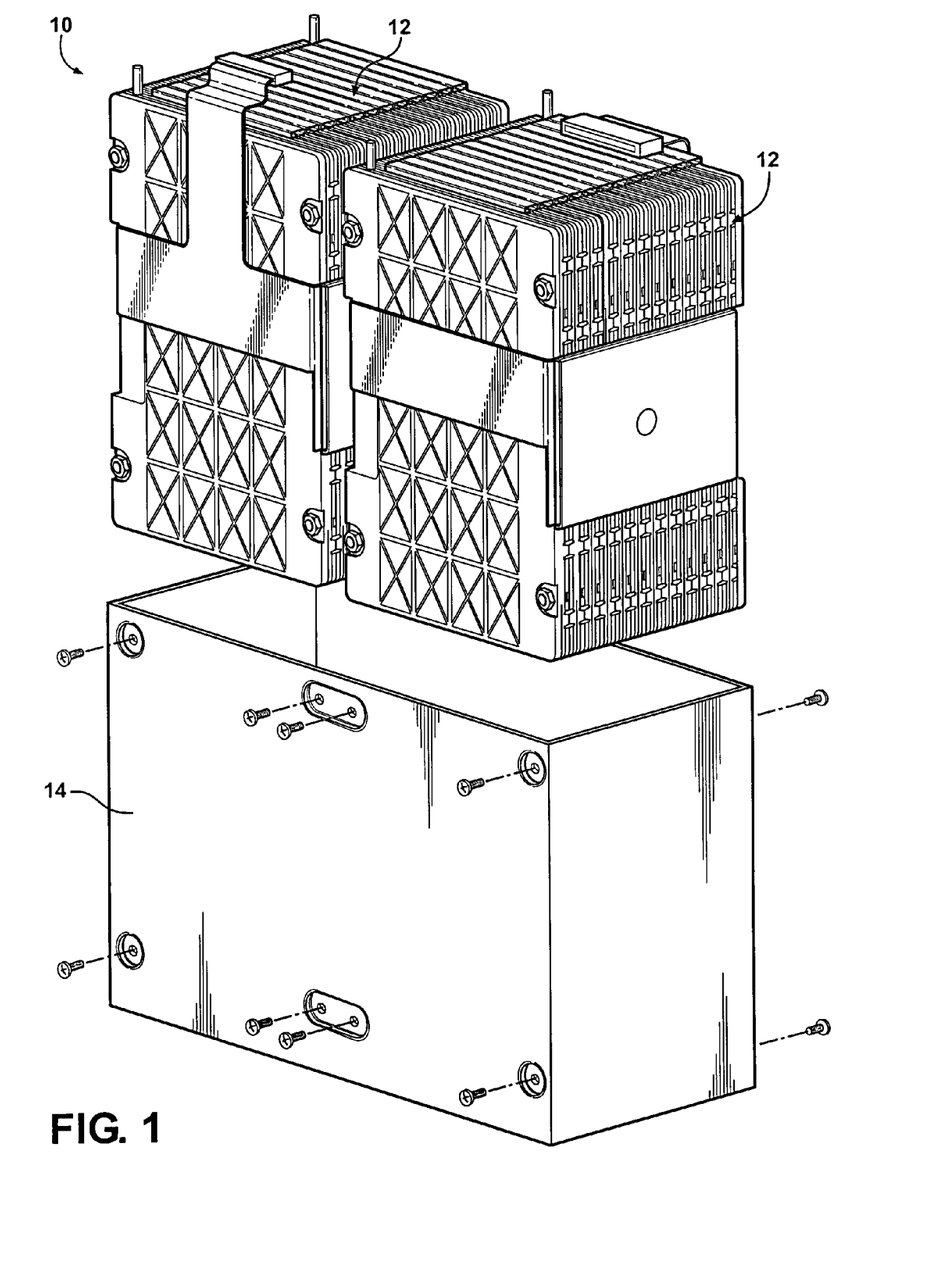
FIG. 1 illustrates a battery case having a pair of battery packs of the present invention.
Figure 2:
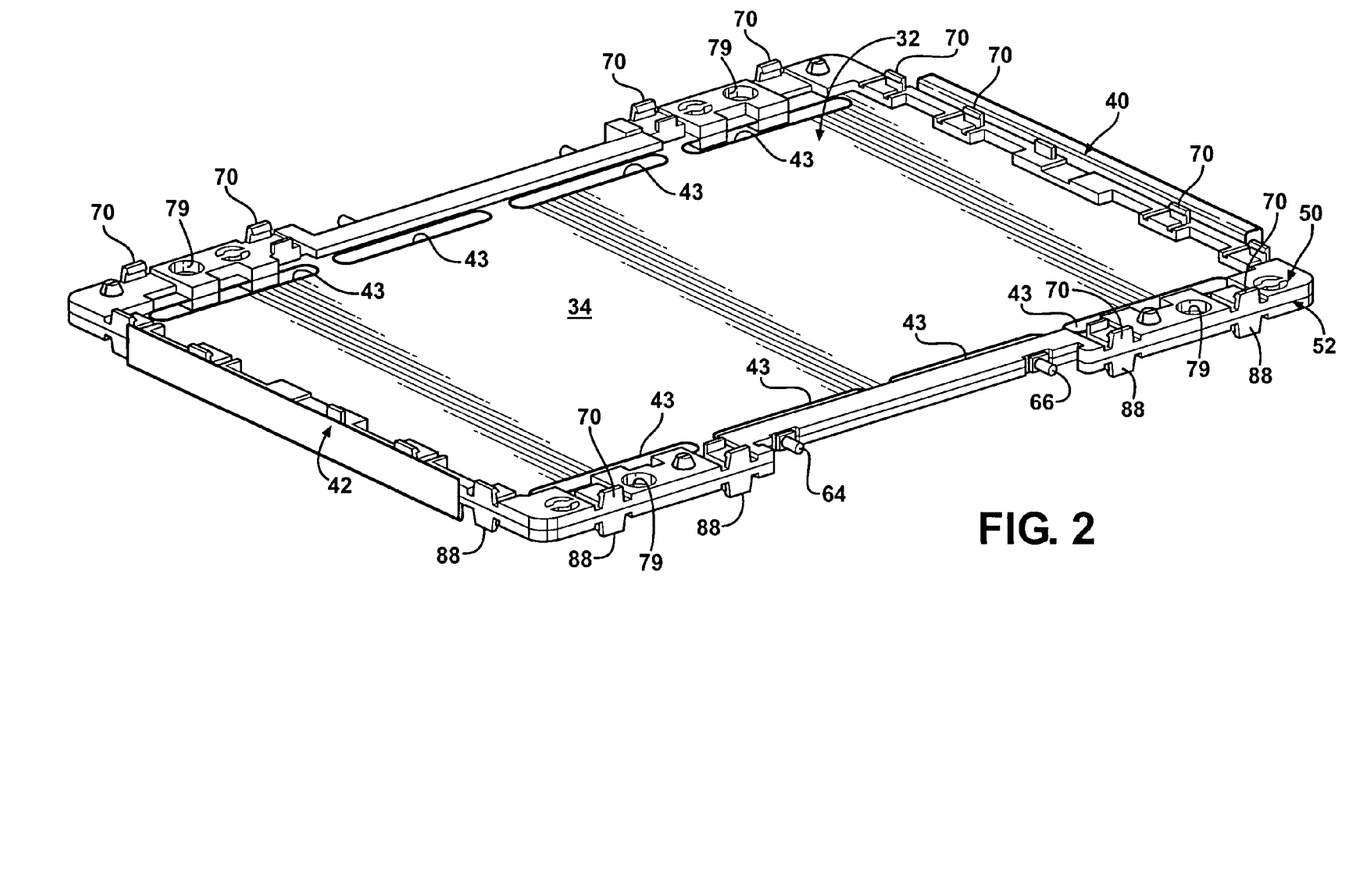
FIG. 2 illustrates a heat sink sandwiched between a pair of inner frames.
Figure 3:
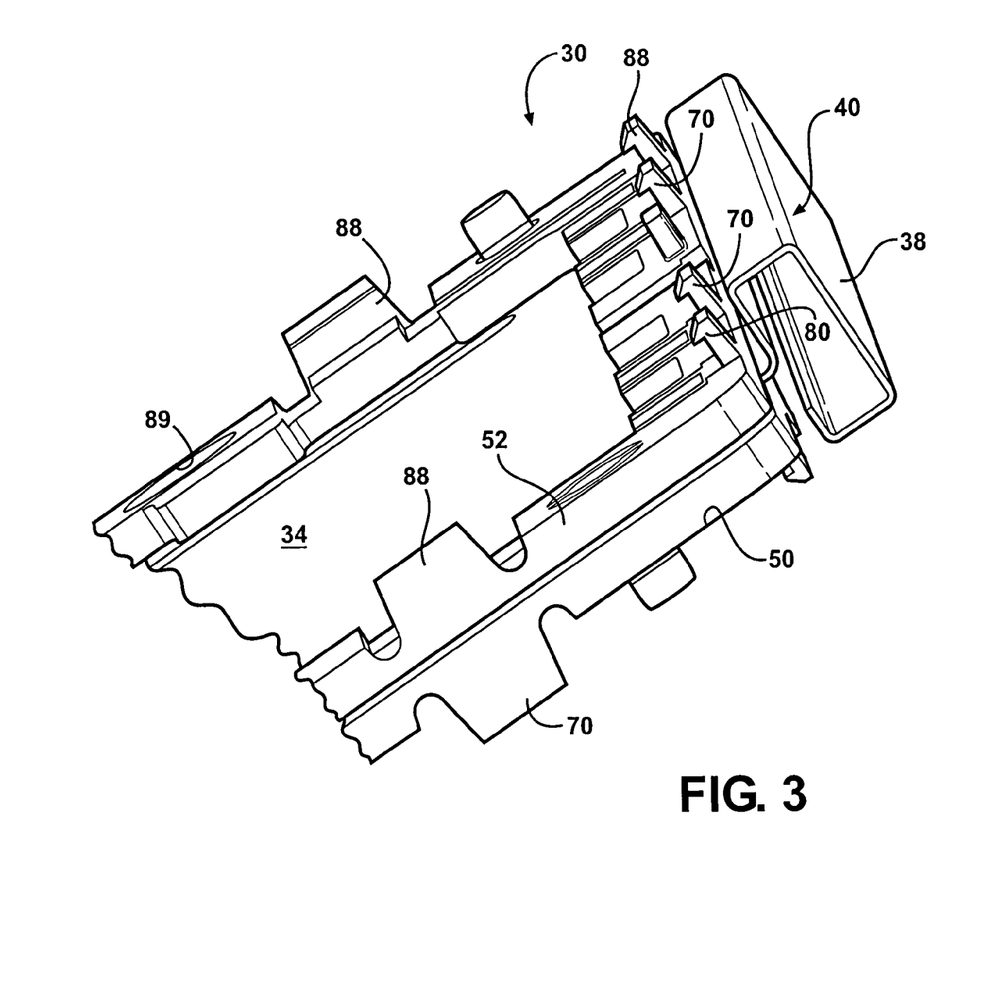
FIG. 3 illustrates a fragmental perspective view of the heat sink sandwiched between the inner frames as shown in FIG. 2.

Referring to the Figures, wherein like numerals indicate like or corresponding parts, a battery assembly of the present invention is generally indicated at 10 in FIG. 1 having a pair of battery packs, generally indicated at 12, disposed in a housing 14. The battery pack 12 is adaptable to be utilized in various configurations including and not limited to a horizontally or vertically stacked battery cell packaging configuration used in an automotive vehicle applications or non-automotive applications. Each battery pack 12 includes a plurality of cells 16. Preferably, each cell 16 is a lithium ion cell having a prismatic configuration without limiting the scope of the present invention. Those skilled in the battery art will appreciate that other cells can be utilized with the present invention. Each cell 16 includes a plurality of battery components (not shown) co-acting between one another with electrolyte therebetween as known to those skilled in the lithium battery art. A first electrode is adjacent a first current collector and a second electrode of charge opposite from the first electrode is adjacent a second current collector. A separator layer is positioned between the first and second electrodes with the first and second electrodes with electrolyte therebetween. A plurality of first electrodes and second electrodes are stacked and packaged into an electrical insulating envelope to form a cell.

Alluding to the above, each cell 16 presents side edges 18 and 20. A first terminal or first bend 22 presents a positive terminal and extends from one of the edges 18. A second terminal or bend 24 presents a negative terminal extending from the other edge 20. Each bend 22 and 24 defines an angle of at least ninety degrees. The angle may vary at its degree and may be configured to be up to ninety degrees without limiting the scope of the present invention. Alternatively, the first and second terminals may present a planar configuration. Each bend 22 and 24 presents a pair of semicircular openings 26. Alternatively, each bend may present other openings (not shown) having different configurations without limiting the scope of the present invention.

Referring now to FIGS. 2 through 6, each battery pack includes a plurality of cell retaining elements, generally shown at 30, removeably connected with one another to form the battery pack 12. FIG. 7 illustrates an exploded view of the battery pack 12 to appreciate the inventive concept. The cell retaining element 30 includes a heatsink, generally indicated at 32. The heatsink 32 presents a plate 34 formed from a thermally conductive material such as aluminum, copper, and the like, without limiting the scope of the present invention. Each heatsink 32 terminates to oppositely spaced from one another fin portions, generally indicated at 36 and 38 in FIG. 4. The fin portion 38 presents a rectangular or tubular cross section 40. The other fin portion 36 presents a flat surface 42. The fin portions 36 and 38 may include a gate shape, may be pleated, planar, may present a plurality of slots or holes, may be formed as a bend to provide a thermal interface plane for an external heating or cooling device including but not limited to heater blankets and/or cooling jackets. Those skilled in the art will appreciate that numerous other shapes of the fin portions 36 and 38 can be utilized to provide better surface area for cooling or heating media, such as liquids, solids, or gasses, and the like, are introduced to the fin portions 36 and 38 of each thermally conductive plate, sheet, or foil to either cool or to heat the cells 16. The fin portions 36 and 38 may be cold formed and are designed to transfer heat either to or from the cells depending on application. The plate 34 defines a plurality of slots 43 and semicircular configuration 44 at the sides 46 of the plate 34 to receive a plurality of rods 48 extending therethrough to interconnect the cell retaining elements 30 with one another to form the battery pack 12.

As best illustrated in FIGS. 4 through 7, a frame assembly of the cell retaining element 30 is disclosed. The frame assembly includes a first set of inner frames 50 and 52 securing the plate 34, sandwiched between the inner frames 50 and 52, and a second set of outer frames 54 and 56 for securing the cells 16. One of the cells 16 is secured between one of the inner frames 50 and one of the outer frames 54. The other inner and outer frames 52 and 56 secure another of the cells 16 retained therebetween.

Figure 4:
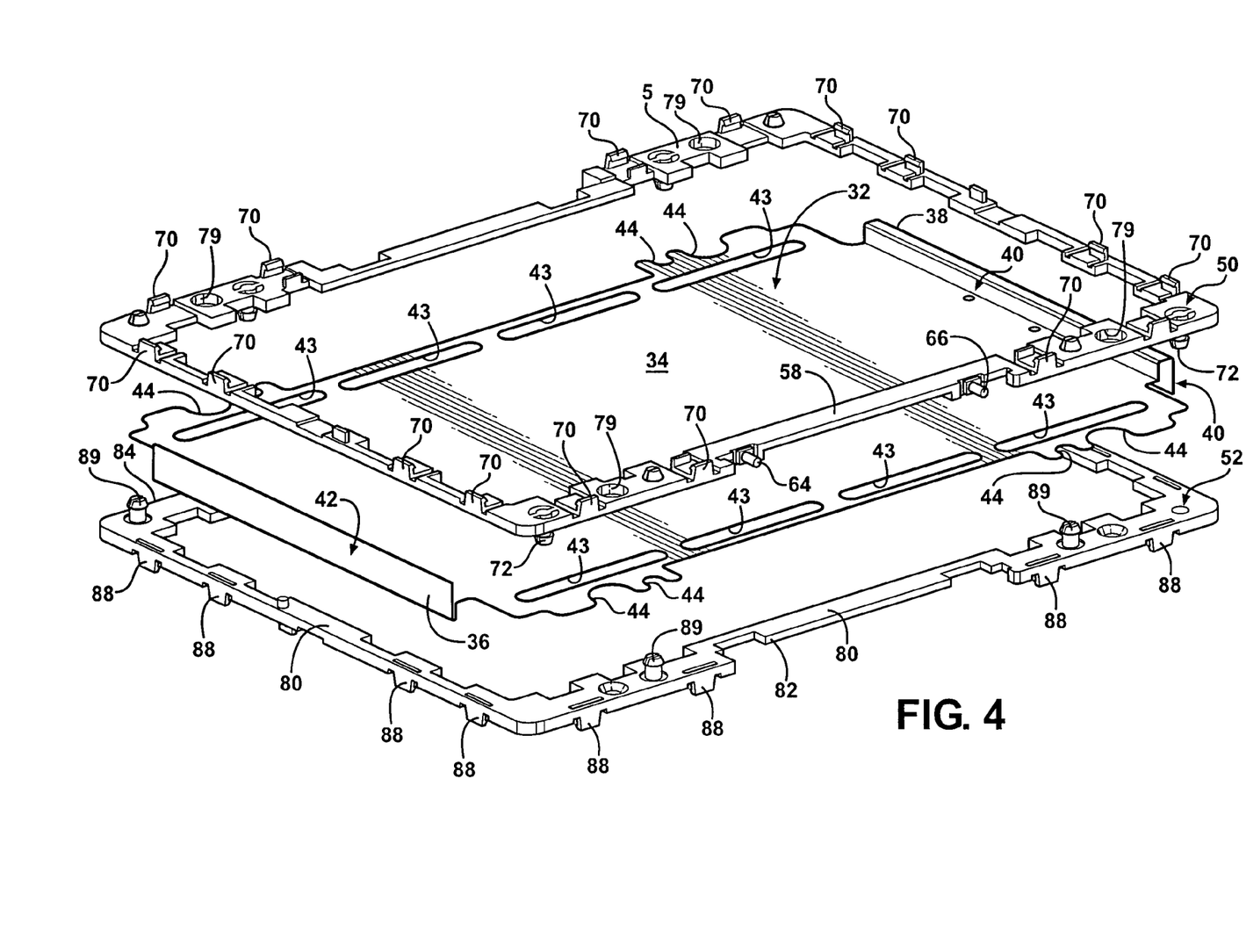
FIG. 4 illustrates an exploded view of FIG. 2.
Figure 5:
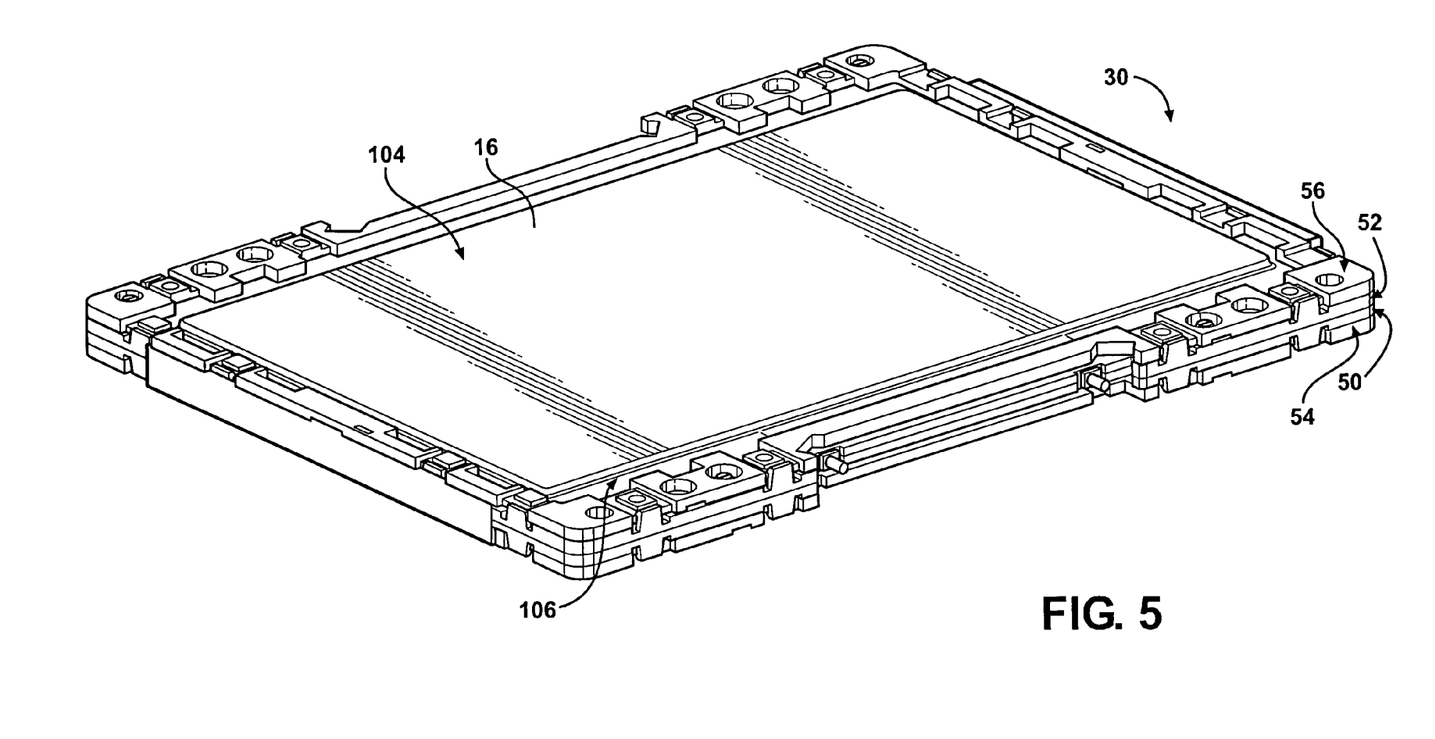
FIG. 5 illustrates a perspective view of a cell retaining element having the heat sink sandwiched between the inner frames, a pair of prismatic cells positioned on opposite sides of the heat sink with each prismatic cell extending over the respective inner frames and a pair of outer frames each extending over the respective prismatic cell.

As best shown in FIG. 4, one of the inner frames 50 presents a peripheral edge 58 and side walls 60 and 62. One of the side walls 62 includes a pair of pins 64 and 66 to electro-mechanically engage the bends 22 or 24 of the cells 16. A plurality of holes or female connectors 68 are defined in the inner frame 50. A plurality of male connectors or hooks 70 are formed and integrally extend from and about the peripheral edge 58 of the inner frame 50. The hooks 70 extend in the opposite direction and away from the plate 34. A plurality of studs 72 extend from the inner frame 50 in the direction opposite from the hooks 70 to mechanically engage another inner frame 52 and the plate 34 sandwiched therebetween.

Figure 6:
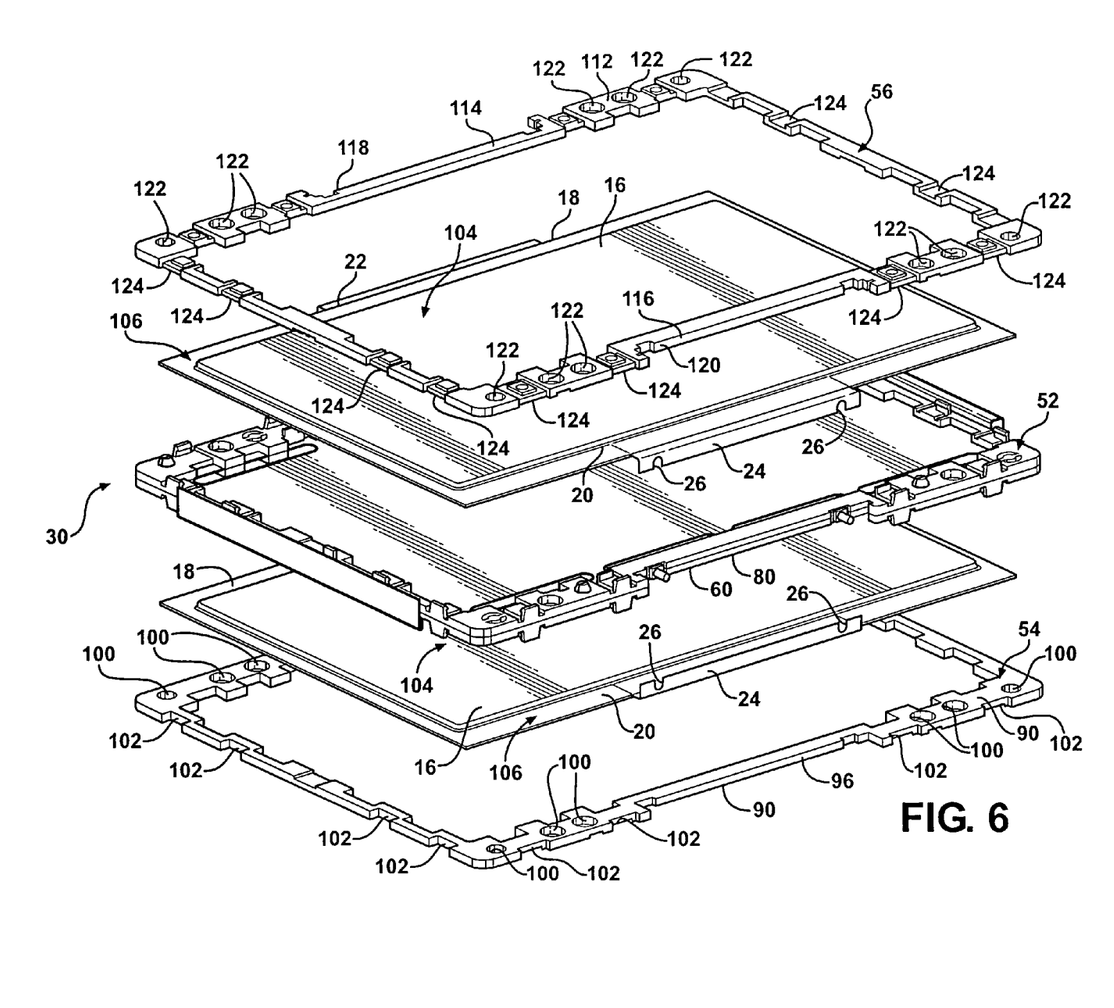
FIG. 6 illustrates an exploded view of the cell retaining element shown in FIG. 5.
Figure 7:
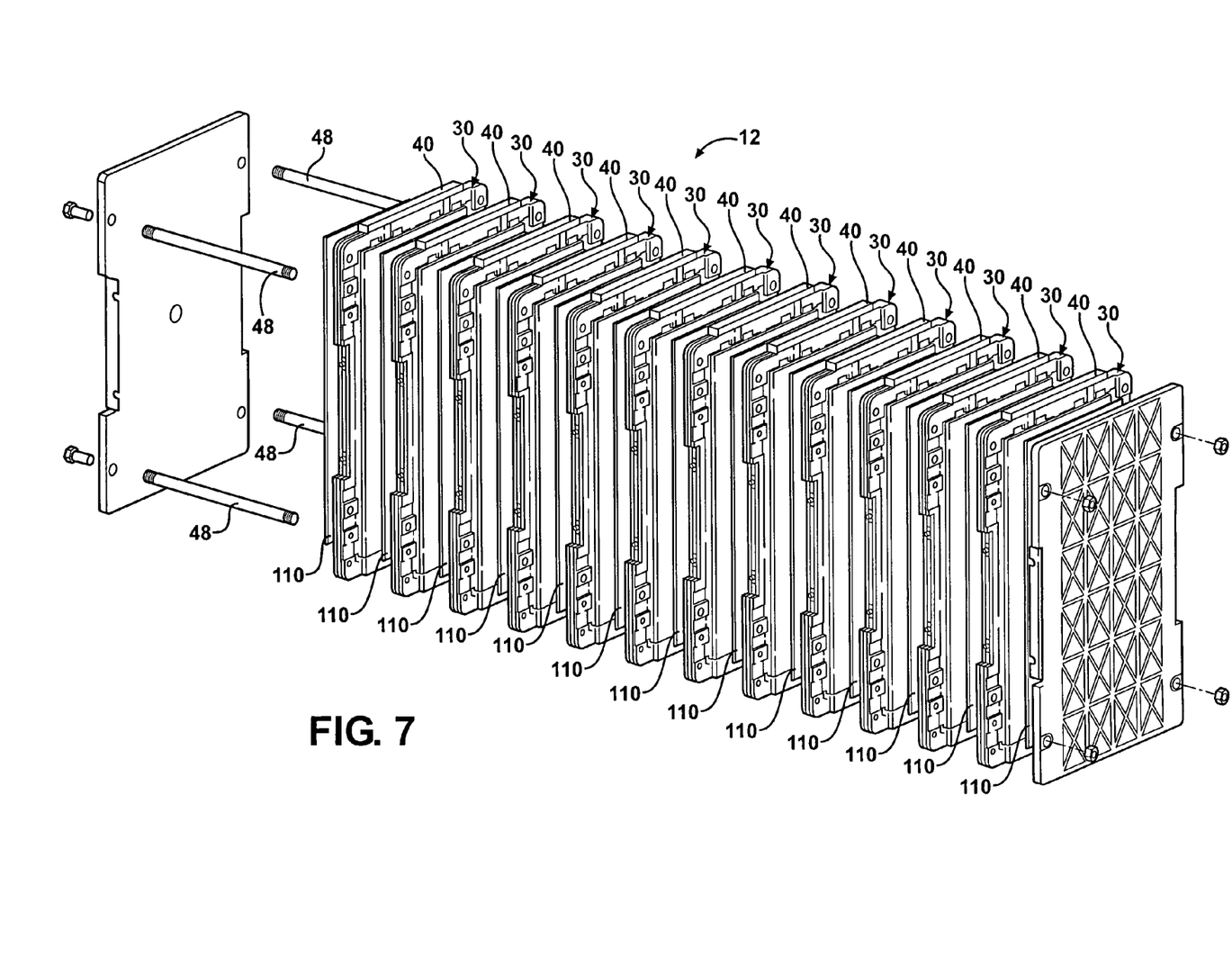
FIG. 7 illustrates a perspective and exploded view of one of the battery module including a plurality of the cell retaining elements.

As best illustrated in FIG. 6, another inner frame 52 presents a configuration similar to the configuration of inner frame 52. The inner frame 52 includes a peripheral edge 80 and side walls 82 and 84. One of the side walls 82 may also includes a pair of pins (not shown) to electro-mechanically engage the bends 22 or 24 of the cells 16. A plurality of holes or female connectors 86 are defined in the frame 52. A plurality of male connectors or hooks 88 are formed and integrally extend from and about the peripheral edge 58 of the frame 50. The hooks 88 extend in the opposite direction and away from the plate 34. A plurality of studs 89 extend from the inner frame 52 in the direction opposite from the hooks 88 to mechanically engage the inner frame 50 and the plate 34 sandwiched therebetween. The frames 50 and 52 are molded from a polymeric material. Those skilled in the art will appreciate that various polymeric materials may be used to form the frames 50 and 52 without limiting the scope of the present invention. The frames 50 and 52 may be partially formed from the polymeric material and have the hooks and studs disposed therein during the molding stage, wherein the hooks and studs may be formed from a non-polymeric material. The molding may be injection molding or cast molding. The materials and methods of formation of the lower frames 50 and 52 are used for exemplary purposes and are not intended to limit the scope of the present invention.

As best shown in FIG. 6, one of the outer frames 54 presents a peripheral edge 90 and side walls 92 and 94 each presenting cut out portions 96 and 98 dimensionally configured to engage the bends 22 and/or 24. A plurality of holes or female connectors 100 are defined in the frame 54. A plurality of female connectors 102 are formed in the peripheral edge 90 to engage the hooks 70 extending from the inner frame 50 in a snap interface to secure one of the prismatic cells 16 therebetween. The outer frame 54 and the inner frame 50 define an opening to surround the raised portions 104 of the cell 16 and sandwiched a peripheral lip portion 106 of the cell 16 therebetween. One of the raised portions 104 of each cell 16 frictionally engaged the plate 34 while the other raised portion 104 frictionally engages the raised portion 104 of another cell 16 retained by adjacent cell retaining element, as best shown in FIG. 7.

Alternatively, as best shown in FIG. 7, a device or a layer of material 110, such as foam or any other non-rigid polymeric materials, is sandwiched between the raised portions 104 of the prismatic cells 16. The device 110 substantially covers the raised portions 104 of the prismatic cell 16. Alternatively, the device 110 is sandwiched between the peripheral lip portion 106 of the cell 16 and the upper frame 54 to mechanically retain the device 110 with the cell retaining element 30. As the cell retaining elements 30 are assembled with one another to form the battery pack 12, the cell 16 of one cell retaining element 30 is placed adjacent the cell 16 of adjacent cell retaining element 30 wherein the device 110 is sandwiched between the prismatic cells 16. As the cell retaining elements 30 are combined to form the battery pack 12, the device 110 allows expansion and contraction of the prismatic cells 16 during typical charge and discharge states therefore causing the cell 16 to maintain intimate contact with the heat sink 34 for efficient thermal transfer inside the battery pack 12 and/or battery assembly 10.

Similarly, the other outer frame 56 presents a peripheral edge 112 and side walls 114 and 116 each presenting cut out portions 118 and 120 dimensionally configured to engage the bends 22 and/or 24. A plurality of holes or female connectors 122 are defined in the frame 56. A plurality of female connectors 124 are formed in the peripheral edge 112 to engage the hooks 88 extending from the inner frame 52 to secure one of the prismatic cells 16 in a snap interface therebetween. The outer frame 56 and the inner frame 52 define an opening to surround the raised portions 104 of another prismatic cell 16 and sandwiched a peripheral lip portion 106 of the prismatic cell 16 therebetween.

One of the raised portions 104 of the prismatic cell 16 frictionally engaged the plate 34 while the other raised portion 104 frictionally engages the raised portion 104 of another cell 16 retained by adjacent cell retaining element, as best shown in FIG. 7. The outer frames 54 and 56 are molded from a polymeric material. Those skilled in the art will appreciate that various polymeric materials may be used to form the frames 54 and 56 without limiting the scope of the present invention. The frames 54 and 56 may be partially formed from the polymeric material and have the hooks and studs disposed therein during the molding stage, wherein the hooks and studs may be formed from a non-polymeric material. The molding may be injection molding or cast molding. The materials and methods of formation of the inner frames 54 and 56 are used for exemplary purposes and are not intended to limit the scope of the present invention.

While the invention has been described as an example embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery assembly comprising:
   at least one battery pack;
   a plurality of prismatic cells of said at least one battery pack; and
   at least one cell retaining element extending between two of said prismatic cells and presenting a pair of mechanical devices with one of said devices mechanically engaging one of said prismatic cells and another of said devices mechanically engaging the other of said prismatic cells thereby locking said prismatic cells with said cell retaining element and forming contact between said at least one cell retaining element and said prismatic cells for manipulating temperature of said prismatic cells through said at least one cell retaining element, wherein the at least one cell retaining element includes a heat transfer element, a first inner frame, a second inner frame, a first outer frame, and a second outer frame;
   the first inner frame and the second inner frame cooperating to hold the heat transfer element;
   the heat transfer element extends between a first prismatic cell and a second prismatic cell and is accessible through an open central portion of the first inner frame and the heat transfer element is accessible through an open central portion of the second inner frame, a central portion of the heat transfer element maintains the first prismatic cell and the second prismatic cell in a spaced apart arrangement;
   the first outer frame cooperates with the first inner frame to hold the first prismatic cell and the second outer frame cooperates with the second inner frame to hold the second prismatic cell; and
   the first prismatic cell is accessible through an open central portion of the first outer frame and the second prismatic cell is accessible through an open central portion of the second outer frame.

2. A battery assembly as set forth in claim 1, wherein one of said mechanical devices is further defined by a plate formed from at least one of thermally conductive materials.

3. A battery assembly as set forth in claim 1, wherein each of the first inner frame and the second inner frame includes a peripheral edge, a plurality of male connectors extending from each of said the first inner frame and the second inner frame, a plurality of female connectors defined in each of the first inner frame and the second inner frame.

4. A battery assembly as set forth in claim 3 wherein each of the first inner frame and the second inner frame includes at least one pin extending therefrom to mechanically engage one of said female connectors defined in another of the first inner frame and the second inner frame.

5. A battery assembly as set forth in claim 1, wherein each of said prismatic cells includes raised portions extending to a peripheral lip portion, a negative terminal and a positive terminal.

6. A battery assembly as set forth in claim 5, wherein each of the first inner frame and the second inner frame includes a pair of studs extending from said peripheral edge of each of the respective one of the first inner frame and the second inner frame to engage at least one positive terminal and/or negative terminal.

7. A battery assembly as set forth in claim 1, wherein each of the first outer frame and the second outer frame includes a peripheral edge and a plurality of female connectors defined in each of the first outer frame and the second outer frame.

8. A battery assembly as set forth in claim 7 wherein each of the first outer frame and the second outer frame are mechanically engaged with the respective one of the first inner frame and the second inner frame.

9. A battery assembly as set forth in claim 1, including a device sandwiched between each of said cell retaining elements for allowing expansion and contraction of said prismatic cells during charge and discharge states therefore causing said prismatic cell to maintain intimate contact with said plate for efficient thermal transfer.

10. A battery assembly as set forth in claim 9, wherein said device is further defined by a layer of expandable material.

11. The battery assembly of claim 1, wherein the first outer frame includes a first plurality of mechanical features and the first inner frame includes a second plurality of mechanical features, the first plurality of mechanical features and the second plurality of mechanical features cooperating to couple to the first outer frame to the first inner frame.

12. The battery assembly of claim 1, wherein the first plurality of mechanical features includes at least one mechanical feature positioned along each edge of the first prismatic cell.

13. The battery assembly of claim 1, wherein the second plurality of mechanical features includes at least one mechanical feature positioned along each edge of the first prismatic cell.

14. The battery assembly of claim 1, wherein the second plurality of mechanical features includes at least one hook positioned along each edge of the first prismatic cell and extending towards the first outer frame.

15. The battery assembly of claim 1, wherein the first outer frame and the first inner frame sandwich a peripheral lip portion of the first prismatic cell and the second outer frame and the second inner frame sandwich a peripheral lip portion of the second prismatic cell.

16. The battery assembly of claim 15, further comprising a first device covering a raised portion of the first prismatic cell through the open central portion of the first outer frame, the first device allows expansion and contraction of the first prismatic cell causing the first prismatic cell to maintain contact with the heat transfer element.

17. The battery assembly of claim 16, wherein the first device is made of an expandable material.

18. The battery assembly of claim 1, wherein the first outer frame and the first inner frame sandwich a peripheral lip portion of the first prismatic cell and the second outer frame and the second inner frame sandwich a peripheral lip portion of the second prismatic cell.

19. The battery assembly of claim 18, further comprising a first device covering a raised portion of the first prismatic cell through the open central portion of the first outer frame, the first device allows expansion and contraction of the first prismatic cell causing the first prismatic cell to maintain contact with the heat transfer element.

20. The battery assembly of claim 19, wherein the first device is made of an expandable material.

* * * * *